(12) United States Patent
Duchaine et al.

(10) Patent No.: US 12,078,356 B2
(45) Date of Patent: Sep. 3, 2024

(54) SUBASSEMBLY COMPRISING MEANS FOR COMPENSATING FOR A DIFFERENCE IN EXPANSION

(71) Applicant: SAFRAN CERAMICS, Le Haillan (FR)

(72) Inventors: Patrick Olivier Duchaine, Moissy-Cramayel (FR); Amaury Benoit Jacques Paillard, Moissy-Cramayel (FR); Eric Conete, Moissy-Cramayel (FR); Benjamin Lacombe, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/546,205

(22) PCT Filed: Feb. 14, 2022

(86) PCT No.: PCT/FR2022/050263
§ 371 (c)(1),
(2) Date: Aug. 11, 2023

(87) PCT Pub. No.: WO2022/175621
PCT Pub. Date: Aug. 25, 2022

(65) Prior Publication Data
US 2024/0044497 A1   Feb. 8, 2024

(30) Foreign Application Priority Data
Feb. 18, 2021 (FR) ..................................... 21 01556

(51) Int. Cl.
 F23R 3/60   (2006.01)
 F01D 9/02   (2006.01)
 F23R 3/00   (2006.01)

(52) U.S. Cl.
 CPC ................ *F23R 3/60* (2013.01); *F01D 9/023* (2013.01); *F23R 3/007* (2013.01); *F23R 2900/00012* (2013.01); *F23R 2900/00017* (2013.01)

(58) Field of Classification Search
 CPC ...... F01D 9/023; F05D 2260/33; F23R 3/002; F23R 3/007; F23R 3/425; F23R 3/44;
(Continued)

(56) References Cited

U.S. PATENT DOCUMENTS

| 3,742,704 A | 7/1973 | Adelizzi et al. |
| 9,488,110 B2 | 11/2016 | Chan et al. |

(Continued)

OTHER PUBLICATIONS

International Search Report & Written Opinion issued Jun. 3, 2022 in PCT/FR2022/050263, filed on Feb. 14, 2022, 16 pages (with English Translation).

*Primary Examiner* — Scott J Walthour
(74) *Attorney, Agent, or Firm* — Oblon, McClelland, Maier & Neustadt, L.L.P.

(57) ABSTRACT

A turbomachine subassembly including a first component forming a portion of a wall of a combustion chamber of the turbomachine and a second component forming a connecting member connecting the first component to a structural element of the combustion chamber, wherein the two components are made from materials having different coefficients of expansion, and wherein the two components are elements of revolution coaxial with a main axis A of the subassembly, and each including an annular radial wall, the radial walls facing one another and bearing against one another axially in a first direction, wherein the second component includes a plurality of clamping tabs, with the clamping tabs collaborating with the first component in order to produce an axial force causing the radial walls to bear against one another.

10 Claims, 3 Drawing Sheets

(58) Field of Classification Search
CPC ...... F23R 3/46; F23R 3/50; F23R 3/52; F23R 3/54; F23R 3/58; F23R 3/60; F23R 2900/00012; F23R 2900/00017
See application file for complete search history.

(56) References Cited

U.S. PATENT DOCUMENTS

| | | |
|---|---|---|
| 2007/0031188 A1 | 2/2007 | Glessner et al. |
| 2014/0109595 A1 | 4/2014 | Carrere et al. |
| 2014/0250893 A1* | 9/2014 | Chan ..................... F02C 7/28 403/30 |
| 2016/0298853 A1 | 10/2016 | Boudin et al. |

* cited by examiner

SUBASSEMBLY COMPRISING MEANS FOR COMPENSATING FOR A DIFFERENCE IN EXPANSION

TECHNICAL FIELD

The invention relates to a subassembly of a turbomachine, in particular of a turboprop engine including two elements made of different materials, and which is capable of keeping a tight connection despite the differences in expansion of the two elements. More particularly, the invention relates to a subassembly including an element forming a portion of a wall of the combustion chamber and a connecting part.

PRIOR ART

The combustion chamber of a turbomachine, in particular of a turbine engine, delimits a space in which air and fuel mix together and are consumed to generate energy capable of driving the turbine engine. The temperature in the combustion chamber could reach about 2,500 K (kelvin).

For the walls of the combustion chamber to be able to withstand such temperatures, a cooling air flow passes through these walls and the material of the walls has been adapted so that at least one portion thereof are made of a material known as CMC (standing for Ceramic Matrix Composite).

Other components of the combustion chamber, in particular elements for connecting the walls of the combustion chamber with a structural element of the turbine engine, are made of steel.

A combustion chamber may include two components made of different materials, i.e. of steel and of CMC, which are connected together in a tight manner.

For example, this tightness is achieved by an axial bearing of two annular radial walls opposite one another, each belonging to one of the two components.

The coefficients of expansion of steel and of CMC are different. This poses a problem of relative movement of the two elements and thus breaking up the tightness of the connection between these two elements.

A solution to compensate for this relative movement consists in inserting flexible flanges to connect the wall of the combustion chamber made of CMC to the structural element and lip seals between the portions that move relative to one another.

The invention aims to provide an alternative solution for a tight connection between two elements made of steel and of CMC.

DISCLOSURE OF THE INVENTION

The invention provides a turbomachine subassembly including a first component forming a combustion chamber wall portion of the turbomachine and a second component forming a member for connecting the first component to a structural element of the combustion chamber, wherein the two components are made of materials having different coefficients of expansion, and wherein the two components are axisymmetric elements coaxial with a main axis A of the subassembly, and each includes an annular radial wall, the radial walls facing each other while bearing axially in a first direction, characterised in that the second component includes a plurality of clamping tabs, which clamping tabs cooperate with the first component to impart an axial force pressing the radial walls against one another.

The cooperation of the clamping tabs with the first component allows holding the axial bearing of the radial walls against one another irrespective of the amplitude of the expansion of each of the components.

Preferably, the first component includes a radial rib against which the clamping tabs bear axially in a direction opposite to said first direction.

Preferably, the clamping tabs are elastically deformed according to the axial direction by cooperation with the radial rib.

Preferably, each of the first component and the second component includes a cylindrical body, the cylindrical bodies of which are coaxial and have different diameters and wherein the radial wall of each component extends radially from the cylindrical body associated therewith in the direction of the cylindrical body of the other component, and the radial rib extends radially from the cylindrical body of the first component in the direction of the second component and is axially offset with respect to the radial wall of the first component.

Preferably, the first component and the second component are assembled together according to an axial translational movement of the second component relative to the first component in the direction in which the radial wall of the second component bears against the radial wall of the first component then according to a rotational movement of the second component relative to the first component about the main axis A.

Preferably, the radial rib includes recesses and solid portions distributed circumferentially in an alternating manner, each clamping tab of which bears axially against a solid portion of the radial rib.

Preferably, the circumferential extent of each recess of the radial rib is at least equal to the circumferential extent of the clamping tab associated therewith.

Preferably, the circumferential extent of each solid portion of the radial rib is at least equal to the circumferential extent of the clamping tab associated therewith.

Preferably, each clamping tab extends radially in the direction of the cylindrical body of the first component from an end radial edge of the radial wall of the second component.

The invention also relates to an aircraft turbomachine including a combustion chamber, one wall of the combustion chamber of which is fastened by a subassembly according to the invention.

DETAILED DISCLOSURE OF THE EMBODIMENTS

Figure 1:
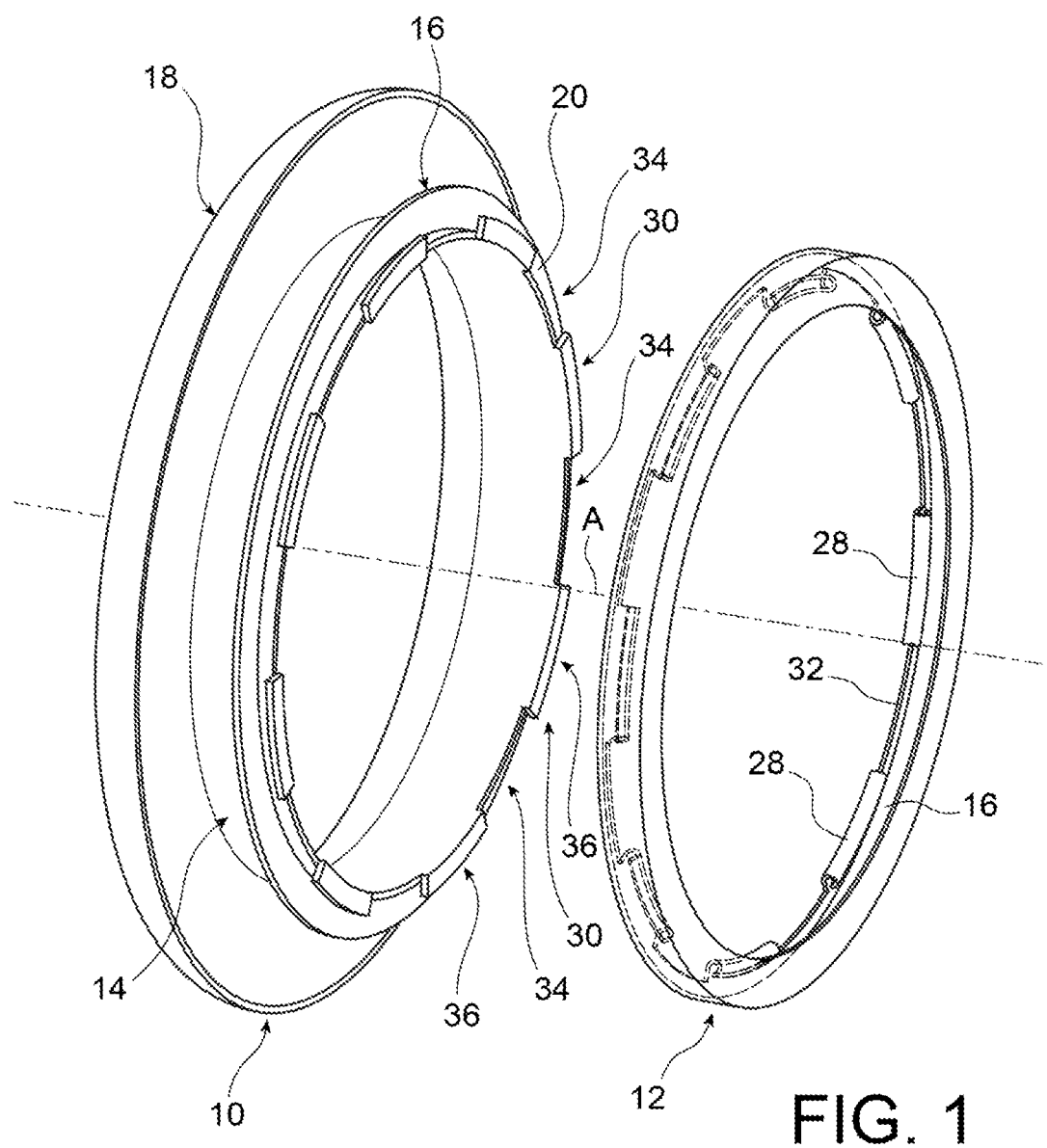
FIG. 1 is a schematic perspective illustration of the two components forming the subassembly according to the invention.

Two components 10, 12 forming a subassembly of a combustion chamber of a turbomachine, and preferably of a turbine engine, are shown in FIG. 1.

In the following description, the direction from upstream to downstream will be adopted arbitrarily and without limitation as being the axial direction from left to right according to the figures.

A first component 10 forms a portion of the wall of the combustion chamber.

This first component 10 is an axisymmetric element centred on a main axis A of the combustion chamber. It is made of a material resistant to the high temperatures that could prevail in the combustion chamber.

Preferably, the first component 10 is made of a ceramic matrix composite (or CMC) material.

The first component includes a cylindrical body 14 coaxial with the main axis A and a radial wall 16 carried by the body and which extends radially outwards, with respect to the main axis A, from a radially outer surface of the cylindrical body 14.

Preferably, the radial wall 16 is located at a first axial end 20 of the cylindrical body 14, herein the downstream axial end of the cylindrical body 14. Furthermore, the radial wall 16 is located axially at a distance upstream from the free downstream edge of this downstream end 20 of the cylindrical body 14.

In this case, the first component 10 is adapted to a so-called "return" combustion chamber, i.e. for a turbine engine wherein the flow duct of the hot gas flow forms an elbow to deflect the flow of the gas flow, unlike a so-called "straight" combustion chamber wherein the flow duct of the gas flow is substantially straight and parallel to the main axis of the turbine engine.

To this end, the first component 10 includes a portion 18 having a C-like curved section associated with the elbow of the flow duct, which is carried by the upstream end of the cylindrical body 14

It should be understood that the invention is not limited to this shape of the first component 10, which may be deprived of this C-like curved portion 18, and/or may include another complementary portion allowing delimiting the combustion chamber.

In turn, the second component 12 is an axisymmetric element coaxial with the main axis A.

The second component is not subjected to the same temperature constraints as the first component, it is made of an alloy based on nickel or cobalt, for example NCK20D, NC22FeD or KCN22W.

The second component 12 includes a body 22 which has a diameter larger than the diameter of the cylindrical body 14 of the first component 10 and which consequently extends partially around and at a distance from the downstream end 20 of the cylindrical body 14 of the first component.

The second component 12 also includes a radial wall 24 which extends radially inwards, along the main axis A, in the direction of the cylindrical body 14 of the first component 10.

Figure 2:
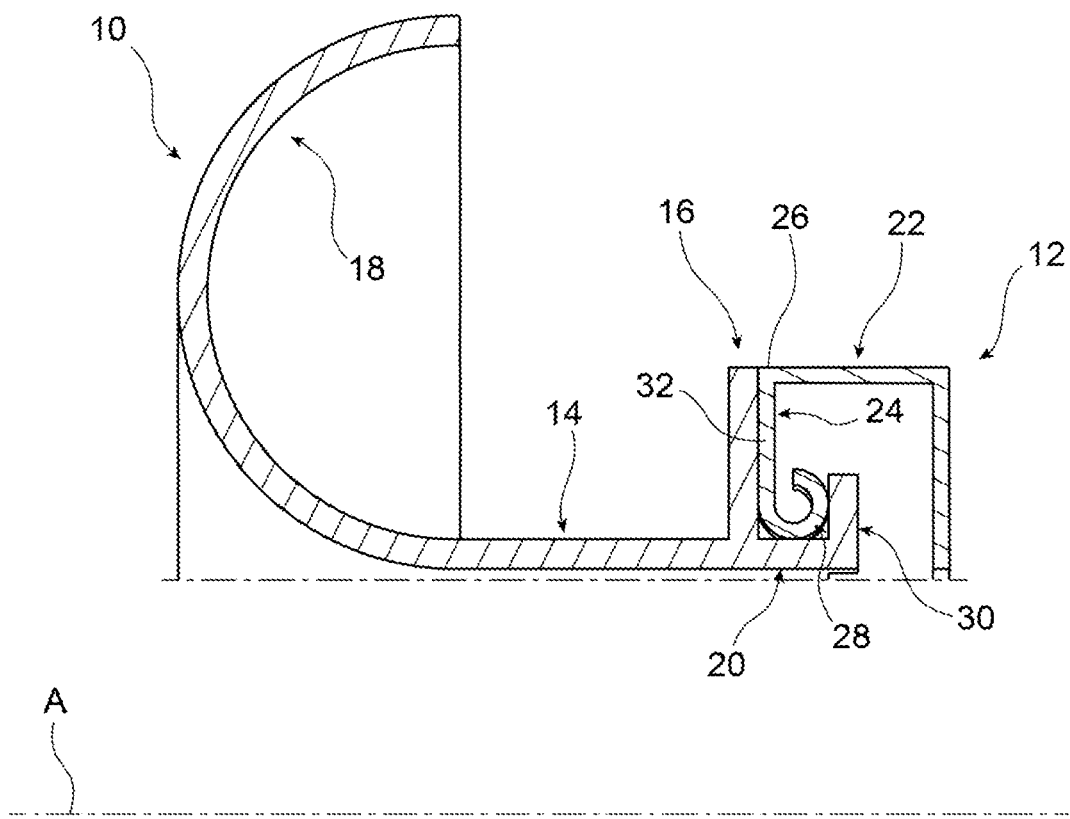
FIG. 2 is a section according to an axial plane of the assembled subassembly.
Figure 3:
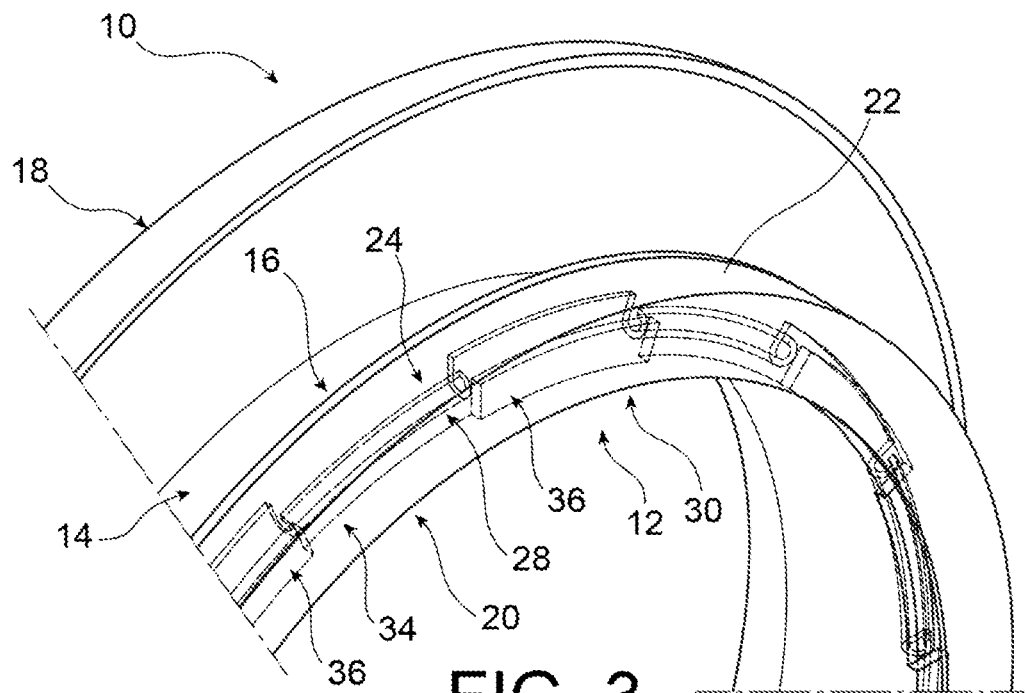
FIG. 3 is a schematic perspective illustration of the subassembly wherein the components are in an intermediate assembly position.
Figure 4:
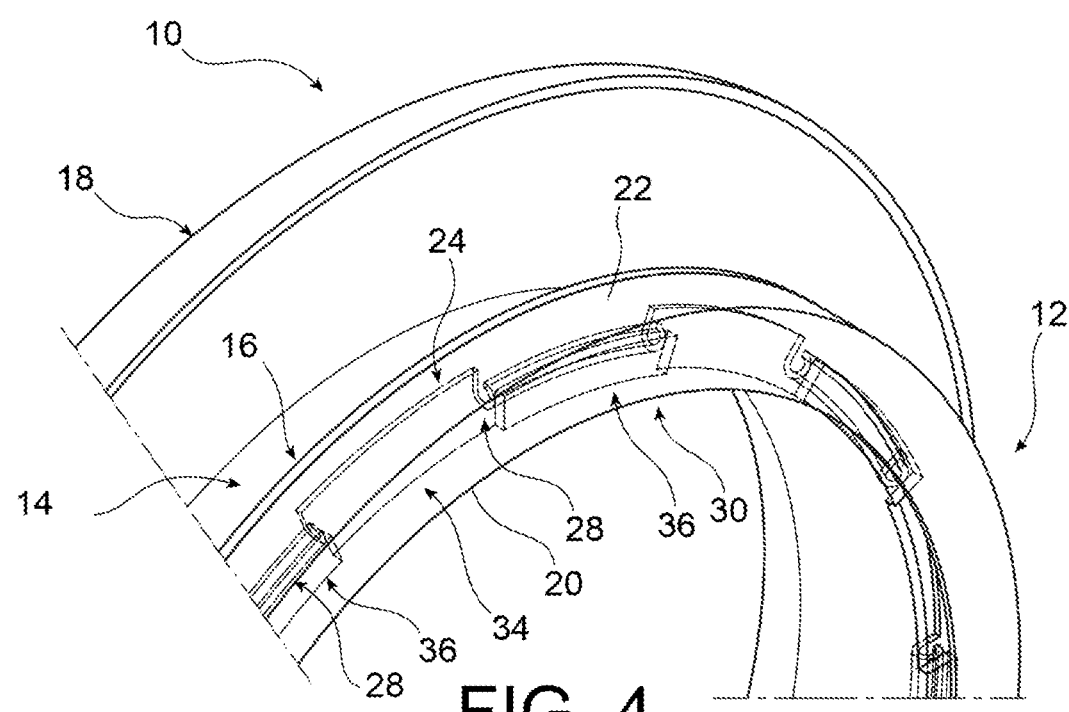
FIG. 4 is a view similar to that of FIG. 3, showing the two components in the assembled position, after rotation of the second component relative to the first component.

Preferably, and as shown in more details in FIG. 2, this radial wall 24 is connected to the upstream end edge 26 of the body 22, which is located axially at the level of the downstream end 20 of the cylindrical body 14 of the first component 10.

The two radial walls 16, 24 of the two components 10, 12 are parallel and bear axially against one another.

The two radial walls 16, 24 being both annular, this axial bearing of the radial walls 16, 24 against one another allows ensuring tightness to gases of the connection between the two components 10, 12.

In this case, the radial wall 24 of the second component 12 bears axially upstream against the radial wall 16 of the first component 10.

The first component 10 and the second component 12 are made of two different materials having different coefficients of expansion.

In this case, the first component 10 expands two to six times less than the second component 12.

To keep the radial walls 16, 24 bearing against one another, the second component includes a plurality of radial clamping tabs 28 which bear axially downstream against a radial rib 30 carried by the body 14 of the first component 10, i.e. in the direction opposite to the direction in which the radial wall 24 of the second component 12 bears against the radial wall 16 of the first component 10.

The radial rib 30 is axially offset downstream with respect to the radial wall 16 of the first component 10.

Thus, the radial tabs 28 are located axially between the radial wall 16 and the radial rib 30.

Moreover, when the two components 10, 12 are assembled together, the radial tabs 28 undergo an elastic deformation, by axial compression against the radial rib 30. In return to this elastic deformation of the radial tabs 28, the radial wall 24 of the second component 12 bears against the radial wall 16 of the second component 12.

According to a preferred embodiment, the radial tabs 28 are carried by the radial wall 24 of the second component 12. The radial tabs 28 extend radially inwards extending the radially inner edge 32 of the radial wall 24 of the second component 12.

The free internal radial end of each radial tab 28 bears axially against the radial rib 30. This free end of each radial tab 28 is curved downstream to come into contact with the radial rib 30.

According to the embodiment shown in the figures, the free end of each radial tab 28 is curved so as to have a cylindrical shape.

It should be understood that the invention is not limited to this embodiment and that the free end of each radial tab could be different without departing from the scope of the invention.

The assembly of the two components 10, 12 together is performed according to an axial movement of the components 10, 12 relative to each other until their radial walls 16, 24 come into contact with each other. In this case, the second component 12 is moved axially upstream relative to the first component 10

As said before, the radial tabs 28 are intended to bear axially downstream against the radial rib 30.

For the radial tabs 28 not to abut axially upstream against the radial rib 30, the radial rib 30 is crenelated and includes an alternating succession of recesses 34 and solid portions 36.

The recesses 34 have a radial height smaller than the distance between the free radial end of the radial tabs 28 and the outer wall of the cylindrical body 14 of the first component 10. Also, the circumferential extent of the recesses 34 is at least equal to the circumferential extent of the radial tabs 28.

The solid portions 36 have a radial height larger than the distance between the free radial end of the radial tabs 28 and the outer wall of the cylindrical body 14 of the first component 10.

Preferably, the circumferential extent of the solid portions 36 is also substantially equal to the circumferential extent of the radial tabs 28.

Thus, according to a preferred embodiment, the solid portions 36 and the recesses 34 have the same circumferential extent substantially equal to the circumferential extent of the radial tabs 28.

According to another embodiment, the circumferential extent of the recesses 34 is substantially equal to the circumferential extent of the radial tabs 28 and the circumferential extent of the solid portions 36 is larger than the circumferential extent of the radial tabs 28.

The presence of these recesses 34 and these solid portions 36 enables the radial tabs 28 to pass axially throughout the radial rib 30 during the axial movement of the second component 12 upstream relative to the first component 10.

Thus, the assembly of the two components 10, 12 together is of the bayonet type, i.e. including an axial translation followed by a rotation of the components 10, 12 relative to each other.

In order to be able to perform the axial movement of the second component 12, the components 10, 12 are positioned angularly around the main axis A by setting the radial tabs 28 opposite the recesses of the radial rib 30.

At the end of the axial movement of the second component 12 upstream relative to the first component 10, the radial walls 16, 24 of the two components 10, 12 bear axially against one another.

Afterwards, the second component 12 is rotated about the main axis A relative to the first component 10 to set the radial tabs 28 opposite the solid portions 36 of the radial rib 30.

As said before, when the two components 10, 12 are assembled together, the radial tabs 28 are elastically deformed.

Thus, before the rotation of the second component 12 relative to the first component 10, the free ends of the radial tabs 28 are axially offset downstream with respect to the radial rib.

Upon rotation of the second component 12, the radial tabs 28 are elastically deformed upstream.

For this purpose, the circumferential end edges of each radial tab 28 are chamfered, thereby featuring an inclined face which cooperates with an edge of a solid portion 36 opposite the radial rib to cause the elastic deformation of the radial tab 28.

The invention claimed is:

1. A turbomachine subassembly comprising:
a first component forming a combustion chamber wall portion of the turbomachine; and
a second component forming a member for connecting the first component to a structural element of the combustion chamber,
wherein the first component and the second component are made of materials having different coefficients of expansion,
wherein the first component and the second component are axisymmetric elements coaxial with a main axis of the subassembly, and each includes an annular radial wall, the annular radial walls facing each other while bearing axially against each other, and
wherein the second component includes a plurality of clamping tabs, which clamping tabs cooperate with the first component to impart an axial force pressing the annular radial walls against one another.

2. The subassembly according to claim 1, wherein the first component includes a radial rib against which the plurality of clamping tabs bear axially.

3. The subassembly according to claim 2, wherein the plurality of clamping tabs are elastically deformed in the axial direction by cooperation with the radial rib.

4. The subassembly according to claim 2, wherein each of the first component and the second component includes a cylindrical body, the cylindrical bodies being coaxial and having different diameters and wherein the annular radial wall of each component extends radially from the cylindrical body of the respective first component or the respective second component in the direction of the cylindrical body of the other of the respective first component or the respective second component,
wherein the radial rib extends radially from the cylindrical body of the first component in the direction of the second component and is axially offset with respect to the annular radial wall of the first component.

5. The subassembly according to claim 4, wherein the first component and the second component are assembled together according to an axial translational movement of the second component relative to the first component in the first direction according to a rotational movement of the second component relative to the first component about the main axis.

6. The subassembly according to claim 5, wherein the radial rib includes recesses and solid portions distributed circumferentially in an alternating manner, wherein each clamping tab bears axially against a solid portion of the radial rib.

7. The subassembly according to claim 6, wherein the circumferential extent of each recess of the radial rib is at least equal to the circumferential extent of the clamping tab.

8. The subassembly according to claim 6, wherein the circumferential extent of each solid portion of the radial rib is at least equal to the circumferential extent of the clamping tab.

9. The subassembly according to claim 4, wherein each clamping tab extends radially in the direction of the cylindrical body of the first component from an end radial edge of the annular radial wall of the second component.

10. An aircraft turbomachine including a combustion chamber, one wall of the combustion chamber of which is fastened by the subassembly according to claim 1.

* * * * *